A. K. Noyes,
Music-Leaf Turner,
№ 84,962.    Patented Dec. 15, 1868.

Witnesses
Wm Dennis
W. H. Dennis.

Inventor
Amos K. Noyes
By his Atty. J. Dennis, Jr.

AMOS KNIGHTS NOYES, OF LYNN, MASSACHUSETTS.

Letters Patent No. 84,962, dated December 15. 1868.

APPARATUS FOR TURNING THE LEAVES OF MUSIC-BOOKS.

The Schedule referred to in these Letters Patent and making part of the same.

*To all whom it may concern:*

Be it known that I, AMOS KNIGHTS NOYES, of Lynn, Essex county, State of Massachusetts, have invented a new, useful, and improved Apparatus for Turning the Leaves of Music and other Books; and I do hereby declare the following description and accompanying drawings are sufficient to enable any person skilled in the art or science to which it most nearly appertains, to make and use my said invention or improvements without further invention or experiment:

The nature of my invention and improvements consists in revolving bars, carrying arms, which turn the leaves of a book, said bars being provided with lugs, acted on by dogs fixed on a rotating shaft, so that the musician can turn the shaft with her knee or foot, and also the leaves of the book, while her hands are employed in working the keys of the instrument; and in a pinion, fastened to the shaft that carries the dogs, which pinion is turned by a rack, moved by links and levers, worked by the knee or foot of the musician, to turn the leaves of a book forward or backward, as desired; also, in a clamping-stand, to hold the music-book or leaves in a proper position before the player.

In the accompanying drawings—

In these drawing—

A A are the ends of the frame, and

B, the top.

C is the bottom bar.

These are all fastened together, forming a proper frame for the apparatus.

D is the base of the book-frame, fastened to the top, B.

To this base the inclined book-frame E is fastened, and provided with a stand, F, to hold the book or leaves to be turned; and one portion of this stand is linked to the other, like a parallel ruler, by the links G G, so that it can be opened, and the edges of the leaves or the back of the book inserted, and then closed, to hold the book or leaves; and this clamp may be provided with a button, hook, weight, or spring, to close it on the leaves, and hold them fast.

The shaft H has a screw cut on it, and is fitted to the female screw in the box I, fastened to the bar C; and the lower end of this shaft H traverses through the stand J, also fastened to the bar C.

There is a hub on the upper end of the box I, around the shaft H, with a screw-nut, K, fitted to its upper end.

L L are a series of swinging bars, provided with arms at their upper ends, fitted to turn on the shaft H, and with arms at their lower ends, fitted to turn on the hub of the box I.

To each of the bars L a long arm, N, is fastened, to turn the leaves of the book; and near the outer end of the arm the spring-clamp P is fastened, to receive and hold the edge of the leaf to be turned.

Figure 2:
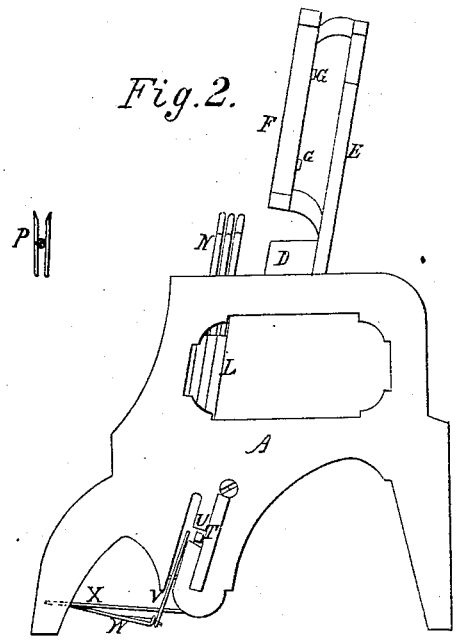
Figure 2 is an elevation of one end.
Figure 1:
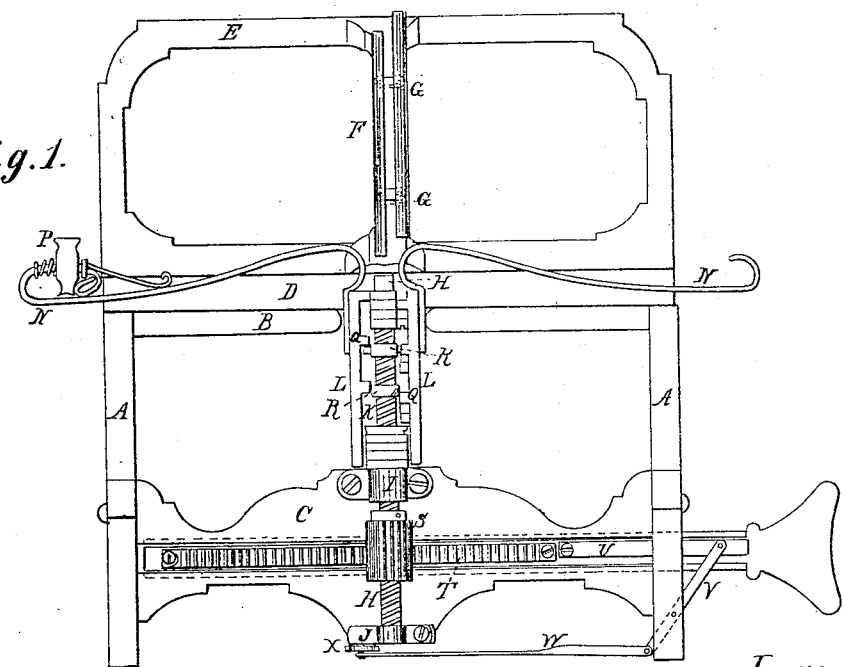
Figure 1 is a front elevation of my improved apparatus for turning the leaves of music-books.

On the inside of each bar there are two lugs, Q Q. These lugs are the highest on the bar that turns the first leaf, and descend, in regular succession, to the last bar, as shown in fig. 1.

There are two two-armed dogs or carriers, R R, fastened to the shaft H.

The upper dog, Q, acting on the upper lugs, turns the leaves forward, when the shaft turns with the sun, to turn the leaves forward, and the lower dog acts on the lower lugs, Q, to turn the leaves backwards, when the shaft is turned against the sun.

The screw on the shaft causes it to descend with the dog, and take each lug in succession, to turn the leaves forward, and to ascend, and take each lug in succession, to turn the leaves backward.

To enable the musician to operate the arms and turn the leaves with her knee or foot, while her fingers are occupied in working the keys of the instrument, I fasten the long pinion S to the shaft H, and make a rack, T, to work or traverse in a groove in the bar C, to turn the pinion and shaft.

One end of the link U is fastened to the rack T, and the other to the lever V, which vibrates on a pin in the end, A, and is worked by the link W, fastened to its lower end, and to the foot-lever X, which vibrates on a pin in the bottom of the musical instrument or bar C, so that the musician, by moving her knee or foot to the left, can turn the leaves forward, and to the right, turn them backwards, and thus turn them either way with the greatest facility, the end of the lever X being forked, to receive the toe of the shoe; and, whenever it is desirable to repeat any part of a tune, one or more leaves may be turned back by moving the foot to the right.

In combination with the lugs Q Q and bars L L, which carry the arms N, I claim the screw-shaft H, with its dogs R R, arranged to turn the bars and arms, substantially as described.

And, in combination with the devices above claimed, I claim the pinion S, rack T, levers V and X, and links U and W, constructed and arranged substantially as described, for the purpose set forth.

I also claim the clamping-stand described, for holding the music-book or leaves, substantially as described.

Witnesses:    AMOS KNIGHTS NOYES.
N. EVERETT SILSBEE,
FRANK. I. PECKER.